United States Patent
Lee et al.

(10) Patent No.: US 11,388,714 B2
(45) Date of Patent: Jul. 12, 2022

(54) METHOD AND APPARATUS FOR PERFORMING USER EQUIPMENT TRIGGERED SEMI-PERSISTENT SCHEDULING ACTIVATION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/925,307

(22) Filed: Jul. 9, 2020

(65) Prior Publication Data

US 2020/0344756 A1    Oct. 29, 2020

Related U.S. Application Data

(63) Continuation of application No. 15/756,968, filed as application No. PCT/KR2017/001081 on Feb. 1, 2017, now Pat. No. 10,721,731.

(Continued)

(51) Int. Cl.
*H04W 72/04* (2009.01)
*H04W 76/10* (2018.01)

(52) U.S. Cl.
CPC ..... *H04W 72/0446* (2013.01); *H04W 72/042* (2013.01); *H04W 72/0406* (2013.01); *H04W 72/0413* (2013.01); *H04W 76/10* (2018.02)

(58) Field of Classification Search
CPC ............. H04W 72/0446; H04W 76/10; H04W 72/0406; H04W 72/0413; H04W 72/042
See application file for complete search history.

(56) References Cited

U.S. PATENT DOCUMENTS 10,721,731 B2     7/2020  Lee et al.
2010/0113058 A1*  5/2010  Wu .................. H04W 72/02
                                                    455/452.1

(Continued)

FOREIGN PATENT DOCUMENTS

CN      101677466       3/2010
CN      101730245       6/2010

(Continued)

OTHER PUBLICATIONS

PCT International Application No. PCT/KR2017/001081, Written Opinion of the International Searching Authority dated Apr. 27, 2017, 2 pages.

(Continued)

*Primary Examiner* — Christopher M Crutchfield
*Assistant Examiner* — Tito Q Pham
(74) *Attorney, Agent, or Firm* — Lee, Hong, Degerman, Kang & Waimey PC

(57) ABSTRACT

A user equipment (UE) receives a SPS resource configuration from an eNodeB (eNB), and transmits information related to a semi-persistent scheduling (SPS) activation for a specific logical channel to the eNB. The information may include timing information for the specific logical channel which indicates when a SPS resource for the specific logical channel should be activated. The specific logical channel may correspond to a vehicle-to-everything (V2X) communication.

18 Claims, 8 Drawing Sheets

Related U.S. Application Data

(60) Provisional application No. 62/290,935, filed on Feb. 3, 2016.

(56) References Cited

U.S. PATENT DOCUMENTS

| | | | |
|---|---|---|---|
| 2011/0249578 A1* | 10/2011 | Nayeb Nazar | H04W 24/10 370/252 |
| 2014/0241319 A1* | 8/2014 | Lee | H04L 1/0027 370/331 |
| 2014/0247763 A1 | 9/2014 | Suzuki et al. | |
| 2014/0269475 A1 | 9/2014 | Ehsan et al. | |
| 2015/0103793 A1 | 4/2015 | Peng | |
| 2015/0282148 A1* | 10/2015 | Le | H04W 72/0406 370/329 |
| 2015/0282210 A1 | 10/2015 | Li et al. | |
| 2015/0351020 A1 | 12/2015 | Lin et al. | |
| 2016/0174280 A1* | 6/2016 | Singh | H04W 76/15 370/329 |
| 2016/0270093 A1* | 9/2016 | Wang | H04L 5/0055 |
| 2017/0019887 A1* | 1/2017 | Jiang | H04W 72/0406 |
| 2017/0071010 A1 | 3/2017 | Lim | |
| 2017/0086081 A1* | 3/2017 | Kim | H04W 4/027 |
| 2017/0135134 A1 | 5/2017 | Rune et al. | |
| 2018/0020473 A1* | 1/2018 | Suzuki | H04W 24/10 |
| 2018/0077676 A1* | 3/2018 | Kaloxylos | H04W 76/27 |
| 2018/0199225 A1* | 7/2018 | Kim | H04W 72/1289 |
| 2018/0270812 A1 | 9/2018 | Lee et al. | |

FOREIGN PATENT DOCUMENTS

| | | |
|---|---|---|
| JP | 2010534997 | 11/2010 |
| JP | 2011071799 | 4/2011 |
| JP | 2012530434 | 11/2012 |
| JP | 2014528674 | 10/2014 |
| KR | 1020150126556 | 9/2015 |
| WO | 2015058382 | 4/2015 |
| WO | 2015179212 | 11/2015 |

OTHER PUBLICATIONS

Qc, "Summary of Informal Email Discussion on sps," 3gpp tsg-ran WG1 #83, R1-157563, Nov. 2015, 9 pages.

United States Patent and Trademark Office U.S. Appl. No. 15/756,968, Office Action dated Mar. 6, 2019, 14 pages.

United States Patent and Trademark Office U.S. Appl. No. 15/756,968, Final Office Action dated Oct. 24, 2019, 18 pages.

Japan Patent Office Application Serial No. 2018-540456, Office Action dated Jun. 11, 2019, 2 pages.

European Patent Office Application Serial No. 17747722.1, Search Report dated Jul. 1, 2019, 6 pages.

Qualcomm Incorporated, "SPS and DRX alignment," 3GPP TSG-RAN WG2 #81, R2-130275, Feb. 2013, 4 pages.

State Intellectual Property Office of the People's Republic of China Application Serial No. 201780003328.0, Office Action dated Aug. 31, 2020, 6 pages.

* cited by examiner

METHOD AND APPARATUS FOR PERFORMING USER EQUIPMENT TRIGGERED SEMI-PERSISTENT SCHEDULING ACTIVATION IN WIRELESS COMMUNICATION SYSTEM

CROSS-REFERENCE TO RELATED APPLICATIONS

This application is a continuation of U.S. patent application Ser. No. 15/756,968, filed on Mar. 1, 2018, which is the National Stage filing under 35 U.S.C. 371 of International Application No. PCT/KR2017/001081, filed on Feb. 1, 2017 which claims the benefit of U.S. Provisional Application No. 62/290,935, filed on Feb. 3, 2016, the contents of which are all incorporated by reference herein in their entireties.

BACKGROUND OF THE INVENTION

Field of the Invention

The present invention relates to wireless communications, and more particularly, to a method and apparatus for performing a user equipment (UE) triggered semi-persistent scheduling (SPS) activation in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I), covering LTE-based communication between a vehicle and a roadside unit (RSU)/network. A RSU is a transportation infrastructure entity (e.g. an entity transmitting speed notifications) implemented in an eNodeB (eNB) or a stationary UE.

In V2X communication, it is important to reduce the latency so that delay-critical data, e.g. decentralized environmental notification message (DENM) or cooperative awareness message (CAM), is transferred in time.

SUMMARY OF THE INVENTION

The present provides a method and apparatus for performing a user equipment (UE) triggered semi-persistent scheduling (SPS) activation in a wireless communication system. The present invention further provides a method and apparatus for performing a UE triggered SPS reactivation and/or release.

In an aspect, a method for performing a semi-persistent scheduling (SPS) activation, by a user equipment (UE), in a wireless communication system is provided. The method includes receiving a SPS resource configuration from an eNodeB (eNB), and transmitting information related to the SPS activation for a specific logical channel to the eNB.

In another aspect, a user equipment (UE) in a wireless communication system is provided. The UE includes a memory, a transceiver, and a processor, coupled to the memory and the transceiver, that controls the transceiver to receive a SPS resource configuration from an eNodeB (eNB), and controls the transceiver to transmit information related to the SPS activation for a specific logical channel to the eNB.

A UE can trigger SPS activation, reactivation and/or release.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
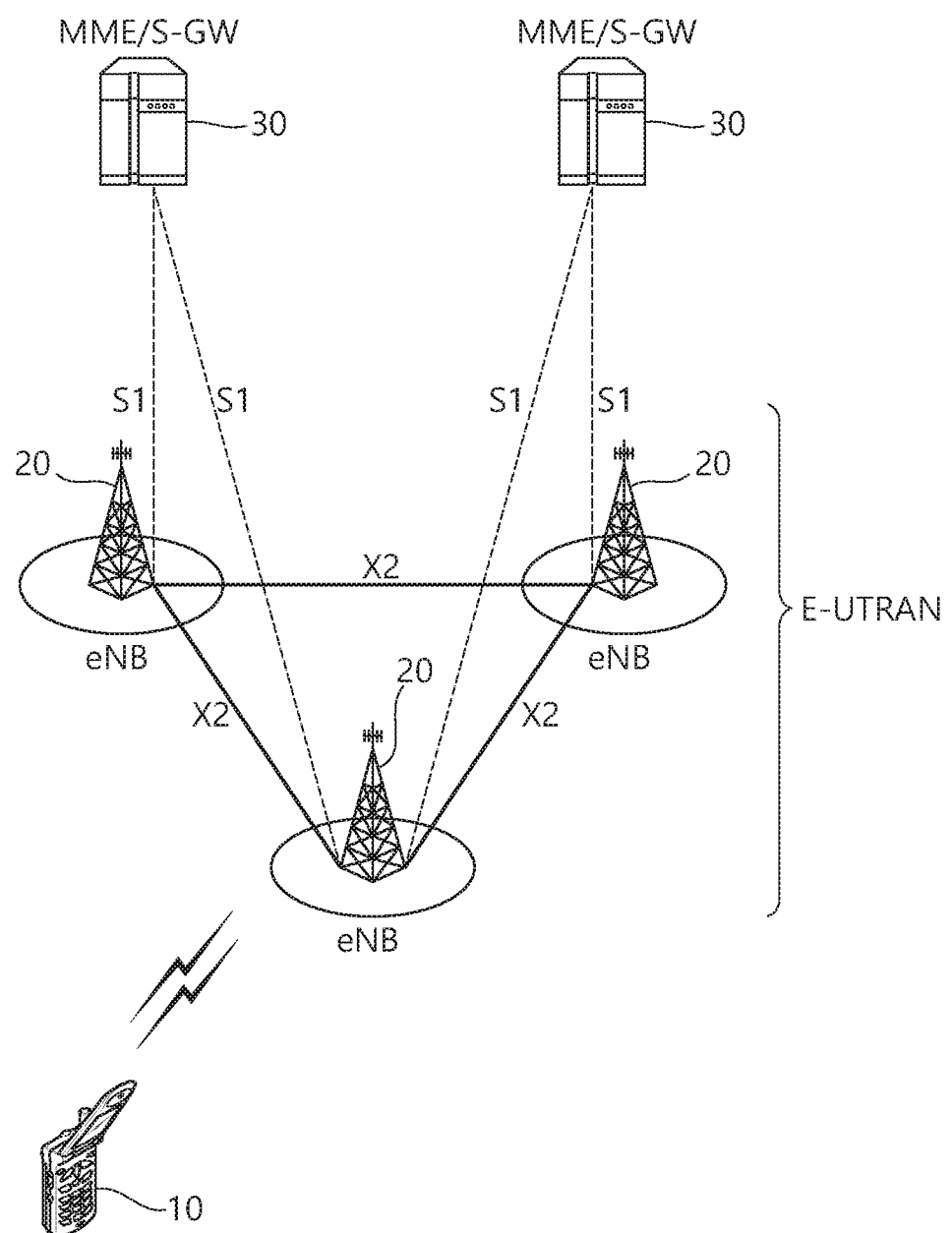
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
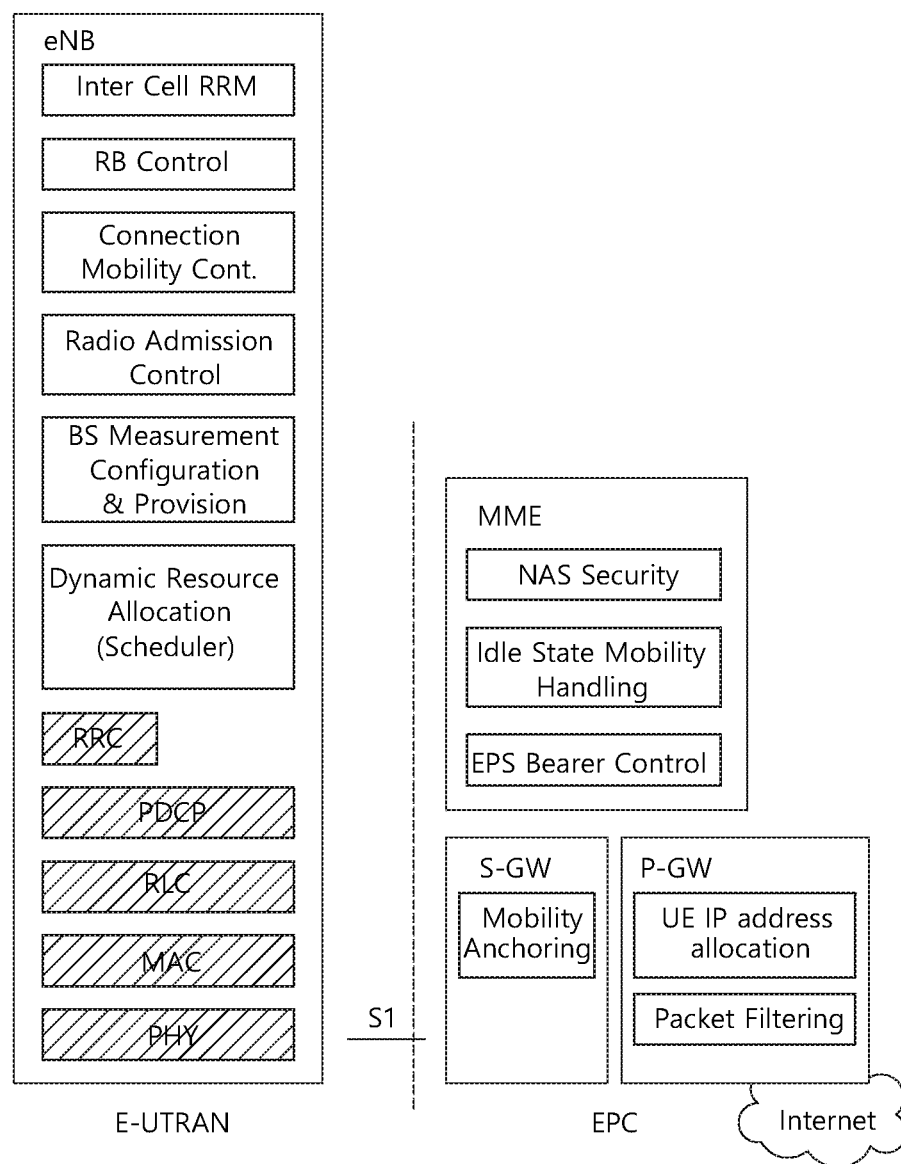
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
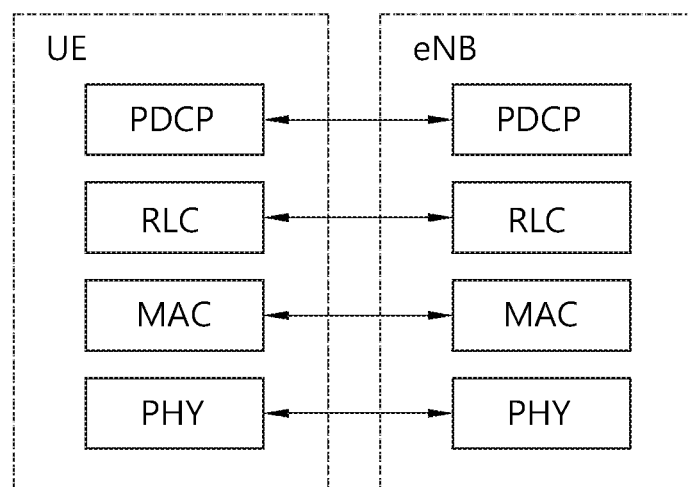
FIG. 3 shows a block diagram of a user plane protocol stack of an LTE system.
Figure 4:
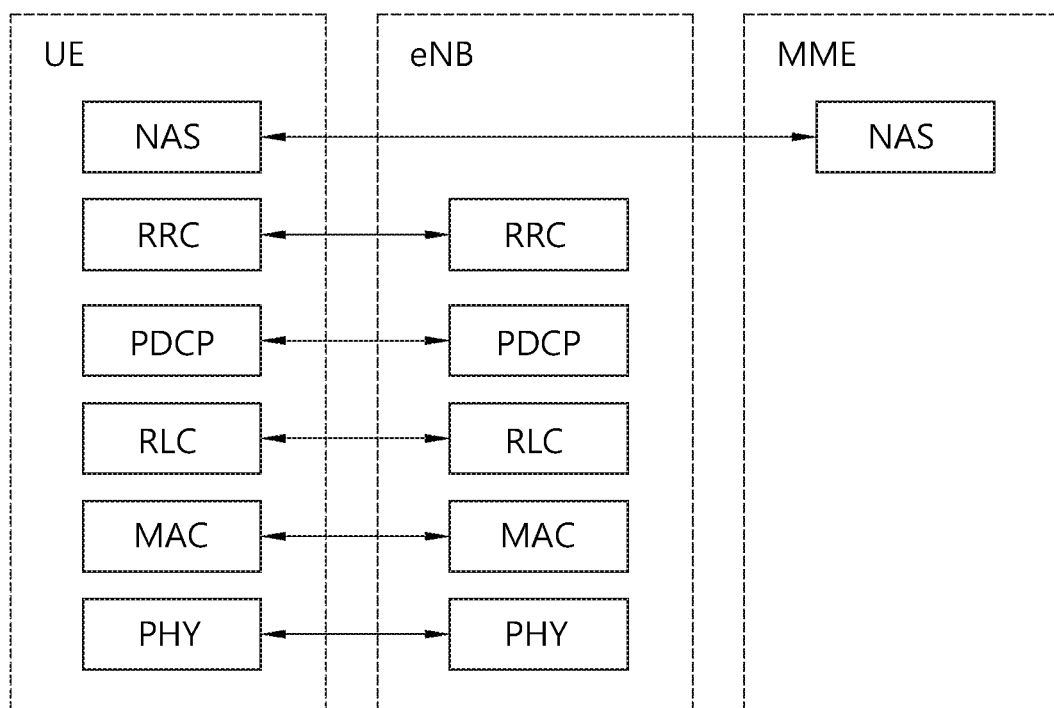
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
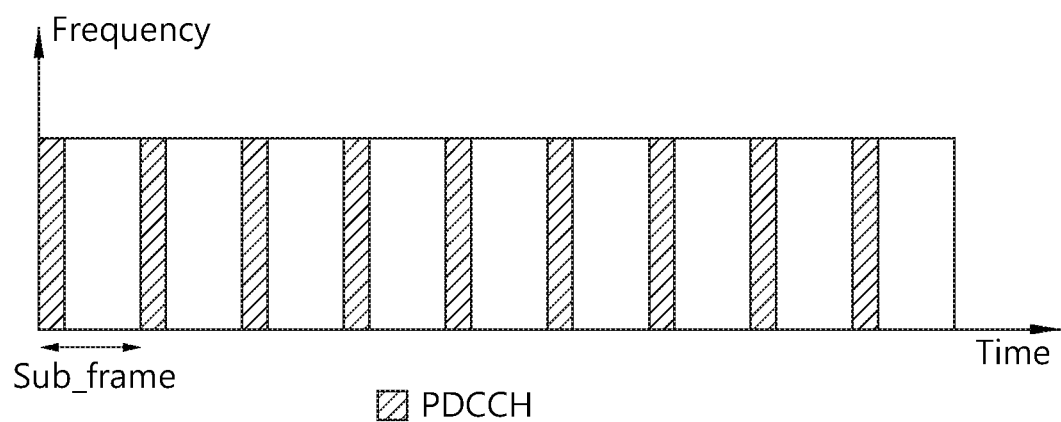
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Semi-persistent scheduling (SPS) is described. E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its cell radio network temporary identity (C-RNTI) on the PDCCH(s), a DL transmission according to the semi-persistent allocation that the UE has been assigned in the TTI is assumed. Otherwise, in the subframes where the UE has semi-persistent DL resource, if the UE finds its C-RNTI on the PDCCH(s), the PDCCH allocation overrides the semi-persistent allocation for that TTI and the UE does not decode the semi-persistent resources.

When carrier aggregation (CA) is configured, semi-persistent DL resources can only be configured for the primary cell (PCell) and only PDCCH allocations for the PCell can override the semi-persistent allocation. When dual connectivity (DC) is configured, semi-persistent DL resources can only be configured for the PCell or primary secondary cell (PSCell). Only PDCCH allocations for the PCell can override the semi-persistent allocation for PCell and only PDCCH allocations for the PSCell can override the semi-persistent allocation for PSCell.

In addition, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined PRBs according to the pre-defined MCS. Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Similarly as for the DL, semi-persistent UL resources can only be configured for the PCell and only PDCCH allocations for the PCell can override the semi-persistent allocation. When DC is configured, semi-persistent UL resources can only be configured for the PCell or PSCell. Only PDCCH allocations for the PCell can override the semi-persistent allocation for PCell and only PDCCH allocations for the PSCell can override the semi-persistent allocation for PSCell.

When SPS is enabled by RRC, the following information is provided:
SPS C-RNTI;
UL SPS interval semiPersistSchedIntervalUL and number of empty transmissions before implicit release implicitReleaseAfter, if SPS is enabled for the UL;
Whether twoIntervalsConfig is enabled or disabled for UL, only for time division duplex (TDD);
DL SPS interval semiPersistSchedIntervalDL and number of configured HARQ processes for SPS numberOfConfSPS-Processes, if SPS is enabled for the DL;

When SPS for UL or DL is disabled by RRC, the corresponding configured grant or configured assignment shall be discarded.

The above information may be carried in SPS-Config information element (IE). The IE SPS-Config is used to specify the SPS configuration. Table 1 shows the SPS-Config IE.

```
-- ASN1START
SPS-Config ::=       SEQUENCE {
    semiPersistSchedC-RNTI                  C-RNTI
    OPTIONAL,                               -- Need OR
    sps-ConfigDL                            SPS-ConfigDL
    OPTIONAL,                               -- Need ON
    sps-ConfigUL                            SPS-ConfigUL
    OPTIONAL                                -- Need ON
}
SPS-ConfigDL ::=     CHOICE {
    release                                 NULL,
    setup                                   SEQUENCE {
        semiPersistSchedIntervalDL          ENUMERATED {
    sf10, sf20, sf32, sf40, sf64, sf80,
    sf128, sf160, sf320, sf640, spare6,
    spare5, spare4, spare3, spare2,
    spare1}
        numberOfConfSPS-Processes           INTEGER (1..8),
        n1PUCCH-AN-PersistentList           N1PUCCH-AN-PersistentList,
        ...,
        [[    twoAntennaPortActivated-r10                CHOICE {
                        release                                         NULL,
                        setup
    SEQUENCE {
                        n1PUCCH-AN-PersistentListP1-r10 N1PUCCH-AN-
    PersistentList
                        }
                }
                                                        OPTIONAL    --Need ON
        ]]
    }
}
```

-continued

```
SPS-ConfigUL ::=     CHOICE {
  release                               NULL,
  setup                                 SEQUENCE {
    semiPersistSechedIntervalUL         ENUMERATED {
sf10, sf20, sf32, sf40, sf64, sf80,
sf128, sf160, sf320, sf640, spare6,
spare5, spare4, spare3, spare2,
spare1}
    implicitReleaseAfter                ENUMERATED {e2, e3, e4
e8},
    p0-Persistent                       SEQUENCE {
      p0-Nominal PUSCH-Persistent                INTEGER (-
126..24),
      p0-UE-PUSCH-Persistent                     INTEGER (-
8..7)
    }            OPTIONAL,
                      --Need OP
    twoIntervalsConfig                  ENUMERATED {true}
      OPTIONAL,            -- Cond TDD
    . . .,
    [[ p0-PersistentSubframeSet2-r12           CHOICE }
                  release
NULL,
                  setup
SEQUENCE {
                      p0-NominalPUSCH-PersistentSubframeSet2-r12
    INTEGER (-126..24),
                      p0-UE-PUSCH-PersistentSubframeSet2-r12
    INTEGER (-8..7)
              }
        }
                                OPTIONAL -- Need ON
    ]]
  }
}
N1PUCCH-AN-PersistentList ::=      SEQUENCE (SIZE (1..4)) OF INTEGER
(0..2047)
-- ASN1STOP
```

As described above, the SPS-Config IE may include at least one of SPS C-RNTI (semiPersistSchedC-RNTI), UL SPS interval (semiPersistSchedIntervalUL) and number of empty transmissions before implicit release (implicitReleaseAfter), whether twoIntervalsConfig is enabled or disabled for UL (twoIntervalsConfig), and DL SPS interval (semiPersistSchedIntervalDL) and number of configured HARQ processes for SPS (numberOfConfSPS-Processes), if SPS is enabled for the DL.

The SPS-Config IE may be included in RadioResourceConfigDedicated IE. The IE RadioResourceConfigDedicated is used to setup/modify/release RBs, to modify the MAC main configuration, to modify the SPS configuration and to modify dedicated physical configuration. The RadioResourceConfigDedicated IE may be included in one of RRCConnectionReconfiguration message, RRCConnectionReestablishment message, or RRCConnectionSetup message. Table 2 shows The RadioResourceConfigDedicated IE.

TABLE 2

```
-- ASN1START
RadioResourceConfigDedicated ::=          SEQUENCE {
  srb-ToAddModList                        SRB-ToAddModList
    OPTIONAL,          -- Cond HO-Conn
  drb-ToAddModList                        DRB-ToAddModList
    OPTIONAL,          -- Cond HO-toEUTRA
  drb-ToReleaseList                       DRB-ToReleaseList
    OPTIONAL,          -- Need ON
  mac-MainConfig                                     CHOICE {
              explicitValue                          MAC-MainConfig,
              defaultValue                           NULL
  }        OPTIONAL,
                                          -- Cond HO-toEUTRA2
  sps-Config                                         SPS-Config
              OPTIONAL,        -- Need ON
  physicalConfigDedicated                 PhysicalConfigDedicated
    OPTIONAL,          -- Need ON
  . . .,
  [[  rlf-TimersAndConstants-r9           RLF-TimersAndConstants-r9
    OPTIONAL     -- Need ON
  ]],
```

TABLE 2-continued

```
[[ meanSubframePatternPCell-r10          MeasSubframePatternPCell-r10
OPTIONAL     -- Need ON
]],
[[ neighCellsCRS-Info-r11                NeighCellsCRS-Info-r11
             OPTIONAL     -- Need ON
]],
[[ naics-Info-r12                        NAICS-AssistanceInfo-r12
OPTIONAL     -- Need ON
]]}
RadioResourceConfigDedicatedPSCell-r12 ::=        SEQUENCE {
-- UE specific configuration extentions applicable for an PSCell
physicalConfigDedicatedPSCell-r12        PhysicalConfigDedicated
OPTIONAL, -- Need ON
sps-Config-r12                                                    SPS-Config
                      OPTIONAL, -- Need ON
  naics-Info-r12                                   NAICS-AssistanceInfo-
r12 OPTIONAL, -- Need ON
 . . .
}
```

Referring to Table 2, the RadioResourceConfigDedicated IE may include The SPS-Config IE. Except for handover or releasing SPS for master cell group (MCG), E-UTRAN does not reconfigure SPS-Config for MCG when there is a configured DL assignment or a configured UL grant for MCG. Except for SCG change or releasing SPS for SCG, E-UTRAN does not reconfigure SPS-Config for SCG when there is a configured DL assignment or a configured UL grant for SCG.

After a SPS DL assignment is configured, the MAC entity shall consider sequentially that the $N^{th}$ assignment occurs in the subframe for which:

$$-(10*SFN+subframe)=[(10*SFN_{start\ time}+subframe_{start\ time})+N*semiPersistSchedIntervalDL]\ \text{modulo}\ 10240,$$

where $SFN_{start\ time}$ and $subframe_{start\ time}$ are the system frame number (SFN) and subframe, respectively, at the time the configured DL assignment were (re-)initialized.

After a SPS UL grant is configured, the MAC entity shall:
1> if twoIntervalsConfig is enabled by upper layer:
2> set the Subframe_Offset according to Table 3 below.

TABLE 3

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | -1 |
| 2 | Subframe 2 | 5 |
|   | Subframe 7 | -5 |
| 3 | Subframes 2 and 3 | 1 |
|   | Subframe 4 | -2 |
| 4 | Subframe 2 | 1 |
|   | Subframe 3 | -1 |
| 5 | N/A | 0 |
| 6 | N/A | 0 |

1> else:
2> set Subframe_Offset to 0.
1> consider sequentially that the $N^{th}$ grant occurs in the subframe for which:
2> $(10*SFN+subframe)=[(10*SFN_{start\ time}+subframe_{start\ time})+N*semiPersistSchedIntervalUL+Subframe\_Offset*(N\ \text{modulo}\ 2)]\ \text{modulo}\ 10240,$ where $SFN_{start\ time}$ and $subframe_{start\ time}$ are the SFN and subframe, respectively, at the time the configured uplink grant were (re-)initialized.

The MAC entity shall clear the configured UL grant immediately after implicitReleaseAfter number of consecutive new MAC PDUs each containing zero MAC SDUs have been provided by the multiplexing and assembly entity, on the SPS resource.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X Service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service).

The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

According to conventional art, UL transmission using SPS may cause some delay if the gap between generation of user data and the configured SPS resource is big. Thus, if SPS is used for delay sensitive traffic such as V2X communication, SPS scheduling interval should be small enough to support delay requirement. However, smaller SPS scheduling interval may lead to more overhead, because the UE may not fully utilize the configured SPS resources. Accordingly, the gap between generation of user data and the configured SPS resource should be small while the SPS scheduling interval should be fit in order to satisfy delay requirement. Currently, there is no mechanism to support this functionality.

Therefore, a method for performing UE triggered SPS activation, reactivation, and/or release according to the present invention is proposed. According to an embodiment of the present invention, the UE may receive SPS configuration for one or more specific logical channels. The UE may receive the SPS configuration for the specific logical channel via system information, RRC connection setup message, RRC connection re-establishment message, or RRC connection release message. When data becomes available for the specific logical channel(s), the UE may request SPS activation to the eNB and then perform UL transmission by using the configured SPS resources, depending on SPS activation command received from the eNB. The UE may transmit the SPS activation request to the eNB on physical uplink control channel (PUCCH), MAC control element (CE), or RRC message. That is, the UE may transmit the SPS activation request to the eNB by using control resources used to request SPS activation. The control resources may be PUCCH resources, random access resources, or new UL control channel resources. Further, the UE may transmit the SPS activation request to the eNB e.g. during RRC connection (re-)establishment, during handover, after handover complete, or in RRC_CONNECTED.

Since the UE actively requests SPS activation to the eNB when there is UL data to be transmitted, the gap between generation of UL data and the configured SPS resource can be reduced.

In another embodiment of the present invention, the UE may receive SPS configuration for a specific PDN or for a specific service/application such as V2X communication. The UE may receive the SPS for the specific PDN or for the specific service/application via system information, RRC connection setup message, RRC connection re-establishment message, or RRC connection release message. When data becomes available for the specific PDN or for specific the service/application, while in RRC_IDLE state or RRC suspended state, the NAS layer of the UE may trigger RRC connection (Re-)establishment with establishment cause set to periodical/SPS resource request. The UE may request SPS activation to the eNB in the RRC connection (re-establishment) request message and then perform UL transmission by using the configured SPS resources, depending on SPS activation command received from the eNB.

Figure 6:
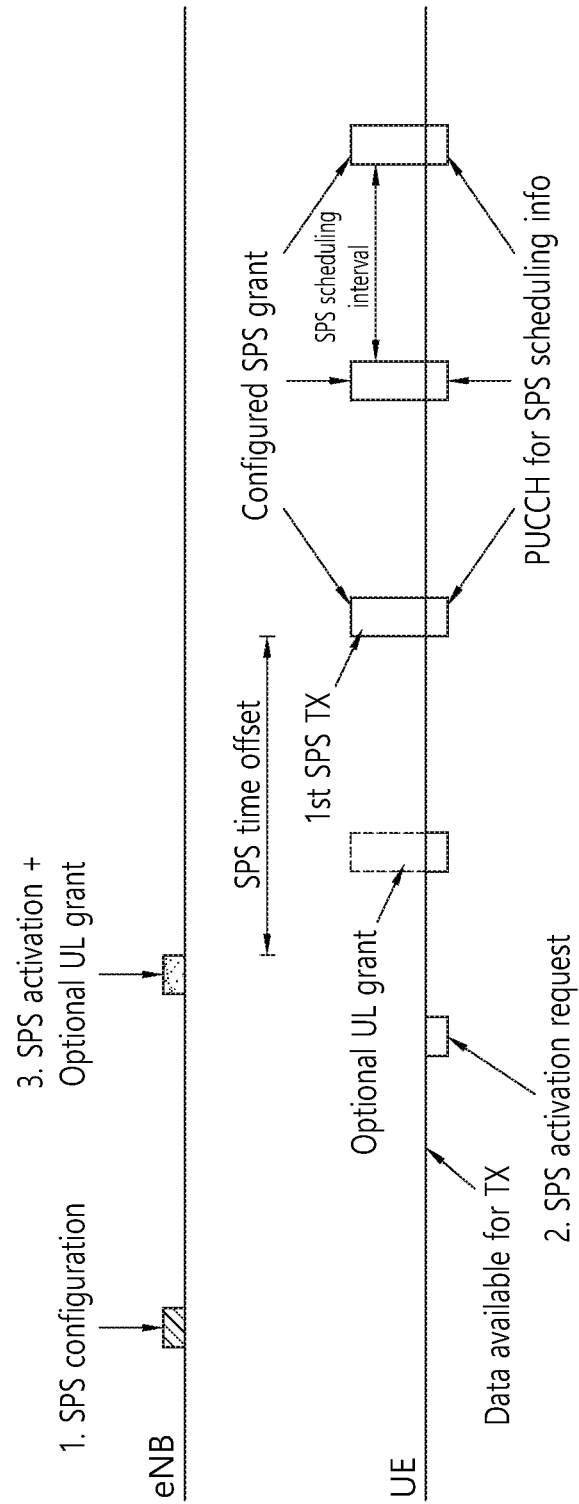
FIG. 6 shows an example of SPS configuration and SPS activation request according to an embodiment of the present invention.

FIG. 6 shows an example of SPS configuration and SPS activation request according to an embodiment of the present invention. FIG. 6 shows how the eNB/UE configures and activate SPS resources according to an embodiment of the present invention. In this embodiment, the UE may be in any RRC state, i.e. RRC_CONNECTED, RRC_IDLE or RRC suspended state. In this embodiment, the SPS resources may be exclusively used for V2X communication or V2X related channel. For example, SPS resources may be only used to send V2X messages, so that the SPS resources may be granted only to carry data via one or more specific channel, e.g. a logical channel configured to send V2X messages.

1. Step 1

The eNB provides an SPS configuration (SPS-Config) to the UE by RRC signaling.

The SPS-Config may include at least one piece of the following information.

Time/Frequency information of the SPS resources
Interval of the SPS resources, i.e. SPS scheduling interval
SPS C-RNTI (which can be dedicated to one or more specific logical channels, e.g. for V2X communication)
Validity duration (SPSValidDuration) in which the SPS-Config is valid in a unit of e.g. subframes, radio frames, milliseconds, or seconds,
List of at least one cell (SPSCellList) in which the SPS-Config is valid.
Logical channel identifier(s) which is subject to the SPS-Config, i.e. the specific logical channel(s). In other words, only UL data from logical channels indicated by the logical channel identifier can be transmitted by using the SPS resources. UL data from other logical channels cannot be transmitted by using the SPS resources.

The RRC signaling may be system information, RRC connection setup message or RRC connection reconfiguration message or RRC connection release message. If the UE is in RRC_IDLE, the UE may receive the SPS-Config via system information. Alternatively, if the UE is in RRC_CONNECTED, the UE may receive via RRC connection setup message, RRC connection reconfiguration message, or RRC connection release message. The UE may keep the SPS-Config when the UE moves to RRC_IDLE. So, the SPS-Config may be stored in the UE in RRC_IDLE.

Upon receiving the SPS-Config by RRC signaling, the UE may (re-)configure SPS resources including frequency information of the SPS resources, PUCCH for SPS scheduling information, SPS C-RNTI, SPS scheduling interval and SPSCellList. But, the UE may not determine time information of the SPS resources including SPS time offset, until SPS is activated.

2. Step 2

When UL data becomes available for specific logical channel(s), specific PDN, or specific service/application, the UE triggers a scheduling request (SR) in order to activate SPS. The SR may be for the specific logical channel(s), for the specific PDN, or specific service/application. For example, the SR may be specific to V2X communication, or specific to this SPS operation.

The UE may transmit the SR via PUCCH. The SR may be used to request SPS activation to the eNB. The SR on PUCCH may also be used to inform the eNB about the amount of UL data available for transmission over the specific logical channel(s). Subsequently, the UE may transmit UL-SCH including buffer status report (BSR) MAC CE which can be specific to the specific logical channel(s), a specific logical channel group, specific to the V2X communication, or specific to this SPS operation. The UE may also indicate SPS timing to the eNB together with the BSR MAC CE.

Alternatively, the UE may transmit the SR via random access. In this case, random access preamble (i.e. Msg 1 in random access) or scheduled transmission on UL-SCH (i.e. Msg 3 in random access) may be used to request SPS activation to the eNB. The Msg 1 or Msg 3 may also inform the eNB about the amount of UL data available for transmission over the specific logical channel(s). The Msg 3 may include MAC CE such as BSR MAC CE to inform the eNB about the amount of UL data available for transmission over the specific logical channel(s). The MAC CE may be used to activate SPS. The MAC CE may be specific to the specific logical channel(s), a specific logical channel group, specific to the V2X communication, or specific to this SPS operation. The UE may also indicate SPS timing to the eNB together with the MAC CE.

The SPS timing is used to indicate to the eNB when SPS should be activated. The SPS timing may directly indicate SFN number and subframe number, both of which correspond to when SPS should be activated. Alternatively, the SPS timing may indicate delayed time before transmitting the SPS timing. For example, the delayed time before transmitting the SPS timing may be time interval between SR triggering timing and MAC CE transmission timing.

Operation of step 2 will be described in detail per RRC state. The operation of step 2 may be applied to any RRC state.

(1) When the UE is in RRC_IDLE

When UL data becomes available for specific logical channel(s), specific PDN, or specific service/application (e.g. V2X communication), and when the SPS-Config is available for the serving cell (since the UE receives SPS-Config via system information or RRC connection release message), the UE triggers connection establishment and transmits a message to the eNB in order to activate SPS resources. The message may include at least one of the followings. The message may correspond to RRC connection request message, RRC connection resume request message or RRC connection reestablishment request message.

UE ID, such as system architecture evolution (SAE) temporary mobile subscriber identity (S-TMSI) or C-RNTI; or Cell ID, such as physical cell ID, corresponding to a cell which allocates the C-RNTI; or SPS activation request and/or V2X indication e.g. in establishment cause; or Resume ID (if the UE suspends data RBs (DRBs))

SPS timing (2) When the UE is in RRC_CONNECTED: The UE in RRC_CONNECTED may receive a handover command (e.g. RRC connection reconfiguration message with mobility control information) or the UE may select another cell without a handover command regardless of RRC state.

When UL data becomes available for specific logical channel(s), specific PDN, or specific service/application (e.g. V2X communication), and when the SPS-Config is available for the serving cell (since the UE receives SPS-Config via system information or handover command), if the UE is not in the target cell, the UE performs UL transmission by using the SPS resource towards the source cell. For example, before the UE is synchronized to DL of the target cell or before the UE performs random access towards the target cell, the UE may perform UL transmission by using the SPS resource towards the source cell.

When UL data becomes available for specific logical channel(s), specific PDN, or specific service/application (e.g. V2X communication), and when the SPS-Config is available for the serving cell (since the UE receives SPS-Config via system information or handover command), if the UE is in the target cell, the UE transmits a handover complete message to the target cell in order to activate SPS resources. For example, after the UE is synchronized to the target cell or after the UE performs random access towards the target cell, the UE may transmit a handover complete message to the target cell in order to activate SPS resources. The target cell may transmit a handover command to the source cell. The handover command may include UE's C-RNTI and UE's SPS C-RNTI which of both are used at the target cell. The handover complete message may include at least one of the followings. The handover complete message may correspond to RRC connection reconfiguration complete message, RRC connection request message, RRC connection resume request message or RRC connection reestablishment request message.

UE ID, such as C-RNTI (allocated either by the source cell or target cell), e.g. in C-RNTI MAC CE; or Cell ID, such as physical cell ID, corresponding to a cell which allocates the C-RNTI; or SPS activation request and/or V2X indication e.g. in establishment cause; or Resume ID (if the UE suspends DRBs)

SPS timing

Meanwhile, the above operation of step 2 may be performed when the UE wants to request SPS reactivation, e.g. when SPS timing needs to be adjusted. Thus, the UE may also transmit the SPS activation request for SPS reactivation. Upon receiving the SPS activation command (i.e. SPS re-activation command), the UE may replace old SPS resources with new SPS resources. For example, time offset may be replaced by the SPS re-activation command.

3. Step 3

Upon receiving the SPS activation request from the UE, the eNB transmits a SPS activation command to the UE to activate SPS. The SPS activation request may be received via a scheduling request on PUCCH or RRC messages, such as RRC connection request message, RRC connection resume request message, RRC connection reconfiguration complete message, RRC connection reestablishment request message, or handover complete message, etc. The SPS activation command may correspond to PDCCH addressing UE's C-RNTI or SPS C-RNTI, MAC CE, or RRC messages, such as RRC connection setup message, RRC connection reestablishment message, etc. The SPS activation command may also indicate when SPS is activated for the UE. For example, the SPS activation command may indicate SPS time offset, which corresponds time interval between transmission of the SPS activation command and the first SPS transmission.

The SPS activation command on PDCCH addressed by SPS C-RNTI may grant UL resource to the UE. The UL resource may be allocated before the first SPS transmission occurs, and the UL resource may be independent from the SPS resources. The UL resource may be used for data available for transmission over the specific logical channel(s). The UL resource may correspond to a single UL transmission including subsequent HARQ re-transmissions.

4. Step 4

Upon receiving the SPS activation command from the eNB, the UE (configures and) activates SPS transmissions by using the SPS-Config. If the SPS activation command explicitly indicates when SPS is activated, i.e. SPS time offset, the UE may activate SPS transmission according to the explicit SPS time offset. Otherwise, the SPS time offset may be determined as Nth subframe from the subframe where the SPS activation command is received. The N value may be signaled by RRC message or pre-fixed.

The UE may continue to perform UL transmission by using SPS resources configured by the SPS-Config. The UE may use the SPS resources configured by the SPS-Config only if the UE considers the SPS-Config as valid. In order to determine whether the SPS-Config is valid or not, the UE may use SPSValidDuration and/or SPSCellList included in the SPS-Config.

The specific logical channel may correspond to DRB or signaling radio bearer (DRB). The UE may suspend the DRB for the specific logical channel and then resume the DRB when SPS is activated, i.e. when the SPS activation command is received.

5. Step 5

The UE may request SPS release (or deactivation) by using one of SR (on PUCCH or random access), L1 UL control information, MAC CE or RRC messages. Upon receiving the SPS release request (or deactivation request), the eNB may transmit a SPS release command (or deactivation command) to the UE. The SPS release command (or deactivation command) may correspond to PDCCH addressing UE's C-RNTI or SPS C-RNTI, MAC CE, or RRC messages, such as RRC connection setup message, RRC connection reestablishment message. Upon receiving the SPS release command (or deactivation command), the UE may release the configured SPS resources and stop using the configured SPS resources.

Figure 7:
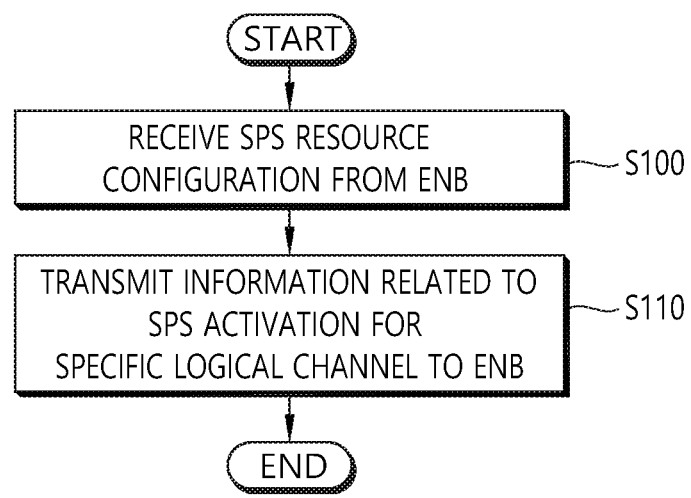
FIG. 7 shows a method for performing a SPS activation by a UE, according to an embodiment of the present invention.

FIG. 7 shows a method for performing a SPS activation by a UE, according to an embodiment of the present invention. The present invention described above may be applied to this embodiment.

In step S100, the UE receives a SPS resource configuration from the eNB. The SPS resource configuration may be for one of the specific logical channel, a specific PDN, a specific application or a specific service. The specific logical channel, the specific PDN, the specific application or the specific service corresponds to V2X communication. The SPS resource configuration includes a logical channel identifier which indicates the specific logical channel subject to the SPS resource configuration.

In step S110, the UE transmits information related to the SPS activation for a specific logical channel to the eNB. The information may include a request for the SPS activation, i.e. SPS activation request. The information may be transmitted via a SR on one of a PUCCH, MAC CE or a RRC message. The information may include timing information for the specific logical channel. The timing information may indicate when a SPS resource for the specific logical channel should be activated. The timing information may include at least one of a SFN or a subframe number.

The UE may further receive a SPS activation command from the eNB. The SPS activation command may include a SPS time offset which indicates when a SPS resource is activated. The SPS activation command on a PDCCH addressed by a SPS C-RNTI may grant UL resource. Upon receiving the SPS activation command, the UE may further perform UL transmission to the eNB by using a SPS resource configured by the SPS resource configuration. Further, the NAS layer of the UE may trigger a connection establishment.

Figure 8:
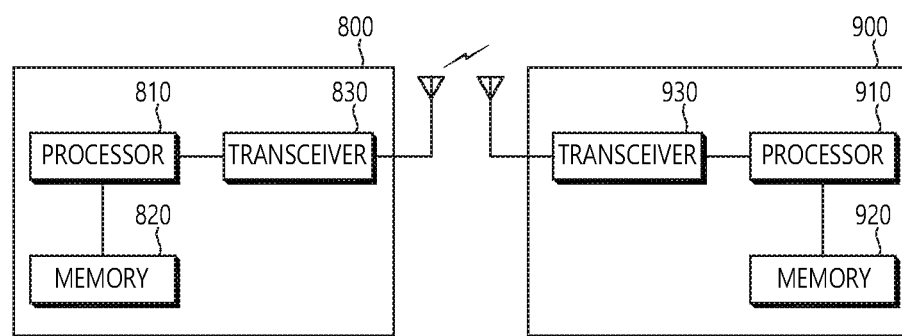
FIG. 8 shows a wireless communication system to implement an embodiment of the present invention.

FIG. 8 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
 entering a connected mode;
 transmitting, to a network, a request message for requesting periodic scheduling of uplink resources while the wireless device is in the connected mode, wherein the request message comprises timing information for at least one periodic uplink resource;
 receiving, from the network, a radio resource control (RRC) connection release message comprising an uplink resource configuration, wherein the uplink resource configuration comprises information for the at least one periodic uplink resource and information for a validity duration during which a transmission using the at least one periodic uplink resource is valid;
 storing the uplink resource configuration to be maintained after receiving the RRC connection release message; and
 performing the transmission using the at least one periodic uplink resource to the network during the validity duration,
 wherein the at least one periodic uplink resource is valid at a specific cell, and
 wherein the transmission comprises a physical uplink shared channel (PUSCH) transmission.

2. The method of claim 1, wherein the timing information is related with a timing of a starting uplink resource among the at least one periodic uplink resource.

3. The method of claim 1, further comprising:
 receiving information for a timing offset related with a timing of a starting uplink resource among the at least one periodic uplink resource.

4. The method of claim 1, further comprising:
 transmitting, to the network, a first message comprising a first parameter informing a first semi-persistent scheduling (SPS) timing for a logical channel;
 after transmitting the first message comprising the first parameter informing the first SPS timing to the network, determining that the first SPS timing needs to be changed to a second SPS timing for the logical channel; and
 transmitting, to the network, a second message comprising a second parameter informing the second SPS timing upon a change of the first SPS timing.

5. The method of claim 1, wherein the RRC connection release message further comprises an interval of the at least one periodic uplink resource and a radio network temporary identifier (RNTI) related to the at least one periodic uplink resource.

6. The method of claim 1, wherein the RRC connection release message further comprises a physical uplink control channel (PUCCH) configuration.

7. The method of claim 1, further comprising:
 resuming a suspended radio bearer of a specific logical channel,
 wherein the at least one periodic uplink resource is used for data of the specific logical channel configured by the network.

8. The method of claim 7, wherein a buffer status report is transmitted via a random access procedure to inform the network about an amount of uplink data available for transmission over the specific logical channel after receiving the RRC connection release message.

9. The method of claim 1, wherein the uplink resource configuration further comprises information informing the specific cell for which the at least one periodic uplink resource is valid.

10. A wireless device in a wireless communication system, the wireless device comprising:
 a transceiver;
 a memory; and
 at least one processor operatively coupled to the transceiver and the memory,
 wherein the at least one processor is configured to:
 enter a connected mode;
 control the transceiver to transmit, to a network, a request message for requesting periodic scheduling of uplink resources while the wireless device is in the connected mode, wherein the request message comprises timing information for at least one periodic uplink resource;
 control the transceiver to receive, from the network, a radio resource control (RRC) connection release message comprising an uplink resource configuration, wherein the uplink resource configuration comprises information for the at least one periodic uplink resource and information for a validity duration during which a transmission using the at least one periodic uplink resource is valid;
 store the uplink resource configuration to be maintained after receiving the RRC connection release message; and
 control the transceiver to perform the transmission using the at least one periodic uplink resource to the network during the validity duration,
 wherein the at least one periodic uplink resource is valid at a specific cell, and
 wherein the transmission comprises a physical uplink shared channel (PUSCH) transmission.

11. The wireless device of claim 10, wherein the timing information is related with a timing of a starting uplink resource among the at least one periodic uplink resource.

12. The wireless device of claim 10, wherein the at least one processor is further configured to control the transceiver to receive information for a timing offset related with a timing of a starting uplink resource among the at least one periodic uplink resource.

13. The wireless device of claim 10, wherein the at least one processor is further configured to:
 control the transceiver to transmit, to the network, a first message comprising a first parameter informing a first semi-persistent scheduling (SPS) timing for a logical channel;
 after transmitting the first message comprising the first parameter informing the first SPS timing to the network, determine that the first SPS timing needs to be changed to a second SPS timing for the logical channel; and
 control the transceiver to transmit, to the network, a second message comprising a second parameter informing the second SPS timing upon a change of the first SPS timing.

14. The wireless device of claim 10, wherein the RRC connection release message further comprises an interval of the at least one periodic uplink resource and a radio network temporary identifier (RNTI) related to the at least one periodic uplink resource.

15. The wireless device of claim 10, wherein the RRC connection release message further comprises a physical uplink control channel (PUCCH) configuration.

16. The wireless device of claim 10, wherein the at least one processor is further configured to resume a suspended radio bearer of a specific logical channel, and
   wherein the at least one periodic uplink resource is used for data of the specific logical channel configured by the network.

17. The wireless device of claim 16, wherein a buffer status report is transmitted via a random access procedure to inform the network about an amount of uplink data available for transmission over the specific logical channel after receiving the RRC connection release message.

18. The wireless device of claim 10, wherein the uplink resource configuration further comprises information informing the specific cell for which the at least one periodic uplink resource is valid.

* * * * *